United States Patent [19]

Berger et al.

[11] Patent Number: 4,626,378
[45] Date of Patent: Dec. 2, 1986

[54] USE OF FLUORINATED NORBORNYLSILOXANES FOR DEFOAMING FRESHLY EXTRACTED DEGASSING CRUDE OIL

[75] Inventors: Roland Berger, Bochum; Hans-Ferdi Fink, Essen; Götz Koerner, Essen; Jaroslav Langner, Essen; Christian Weitemeyer, Essen, all of Fed. Rep. of Germany

[73] Assignee: Th. Goldschmidt AG, Essen, Fed. Rep. of Germany

[21] Appl. No.: 748,727

[22] Filed: Jun. 25, 1985

[30] Foreign Application Priority Data

Jun. 27, 1984 [DE] Fed. Rep. of Germany ....... 3423609

[51] Int. Cl.$^4$ .................. C07F 7/04; B01D 19/04; B01D 17/05
[52] U.S. Cl. .................. 252/321; 252/358; 556/450
[58] Field of Search ................. 252/358, 321; 556/450

[56] References Cited

U.S. PATENT DOCUMENTS

| | | | |
|---|---|---|---|
| 3,038,000 | 6/1962 | Schmidt | 252/358 |
| 3,115,472 | 12/1963 | Currie | 252/358 |
| 3,594,397 | 7/1971 | Meiller | 252/358 |
| 3,639,260 | 2/1972 | Michalski | 252/358 |
| 3,784,479 | 1/1974 | Keil | 252/358 |
| 4,370,160 | 1/1983 | Ziemelis | 252/358 |
| 4,549,004 | 10/1985 | von Au et al. | 252/358 X |

FOREIGN PATENT DOCUMENTS

| | | |
|---|---|---|
| 0091257 | 10/1983 | European Pat. Off. . |
| 59-069110 | 4/1984 | Fed. Rep. of Germany ...... 252/358 |
| 3423609 | 3/1985 | Fed. Rep. of Germany ...... 252/358 |

*Primary Examiner*—John F. Terapane
*Assistant Examiner*—Catherine S. Kilby
*Attorney, Agent, or Firm*—Toren, McGeady, Stanger, Goldberg & Kiel

[57] ABSTRACT

The use of fluorinated norbornylsiloxanes of the general formula

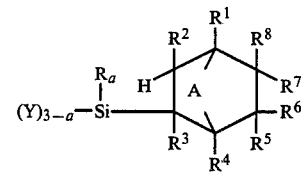

in which
R is a hydrocarbon radical with 1 to 6 carbon atoms or a phenyl radical;
$R^1$, $R^2$, $R^3$, $R^4$ are the same or different and represent hydrogen or methyl radicals;
$R^5$, $R^6$, $R^7$, $R^8$ are the same or different and represent hydrogen, fluorine radicals, hydrocarbon radicals with 1 to 8 carbon atoms, or fluorinated hydrocarbon radicals with 1 to 20 carbon atoms, in which at least one of the $R^5$, $R^6$, $R^7$, $R^8$ radicals must be a fluorine or a fluorinated hydrocarbon radical,
Y is an organosiloxanyl radical,
A is a divalent hydrocarbon radical or an oxygen radical, and
a is 0, 1 or 2 for defoaming freshly extracted degassing crude oil. The compounds are highly effective and show a broader area of application for defoaming degassing crude oils of different origins.

19 Claims, No Drawings

USE OF FLUORINATED NORBORNYLSILOXANES FOR DEFOAMING FRESHLY EXTRACTED DEGASSING CRUDE OIL

BACKGROUND OF THE INVENTION

1. Field of the Invention

The invention relates to the use of fluorinated norbornyl siloxanes for defoaming freshly extracted degassing crude oil.

2. Description of the Prior Art

Freshly extracted crude oil generally contains a considerable proportion of highly volatile hydrocarbons which are dissolved under pressure. When this crude oil under pressure (living crude oil) emerges from the immersion tube of the conveyor pipe line and the pressure on it is released at the extraction site itself or after transport to a terminal, the escaping gas causes unwanted foam formation, which leads to interference with the course of the operation in the gas separators.

European Patent Application No. 0 091 257 discloses the defoaming of degassing crude oil by using organopolysiloxanes which contain not more than 10 weight percent of components having a molecular weight not greater than 50,000, at least 15 weight percent of components having a molecular weight not less than 200,000 and not more than 6 weight percent of components having a molecular weight not less than 370,000. The molecular weights are determined by gel chromatography with a column calibrated with polystyrene.

However, these organopolysiloxanes have the disadvantage that their activity is not adequate for a number of oil varieties. It is also observed that the activity correlates with the defoamer concentration in a way, such that the activity-concentration curve passes through a maximum. This means that initially, on adding about 1 ppm of the defoamer to the crude oil, the defoaming activity commences; on adding 5 to 10 ppm, a maximum in the activity is observed; while at higher additions, the activity declines and even foam stabilization sets in. The state of the curve is affected by the nature of the crude oil and by the particular polysiloxane mixture used, it being possible to displace the activity-concentration maximum. On the average, the defoamers of European Patent Application No. 0 091 257 are used in amounts of about 5 ppm, at which optimum activity is achieved.

SUMMARY OF THE INVENTION

We have discovered compounds which have a lesser crude oil specificity and develop their maximum effectiveness even when added in small amounts. The compounds are particularly distinguished by their high effectiveness even when used in the smallest amounts and are suitable for defoaming degassing crude oils of different origins. By increasing the amounts used, it is furthermore possible to suppress foam formation almost completely in crude oils, which previously could not be defoamed adequately.

Surprisingly, this is accomplished by using as defoaming agents, fluorinated norbornylsiloxanes having the general formula

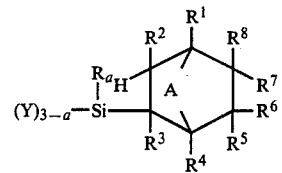

in which

R is a hydrocarbon radical with 1 to 6 carbon atoms or a phenyl radical;

$R^1$, $R^2$, $R^3$, $R^4$ are the same or different and represent hydrogen or methyl radicals;

$R^5$, $R^6$, $R^7$, $R^8$ are the same or different and represent hydrogen or fluorine radicals or hydrocarbon radicals with 1 to 8 carbon atoms or fluorinated hydrocarbon radicals with 1 to 20 carbon atoms, in which at least one of the $R^5$, $R^6$, $R^7$, $R^8$ radicals must be a fluorine or a fluorinated hydrocarbon radical;

Y is an organosiloxanyl radical;

A is a divalent hydrocarbon radical or an oxygen radical; and a is 0, 1 or 2.

The compounds can be used in amounts as small as the range 0.2 to 20 ppm.

DESCRIPTION OF THE PREFERRED EMBODIMENTS

The compounds of formula I are preferably used in amounts of 0.2 to 5 ppm. In formula I, the R, $R^1$ to $R^8$ radicals and the Y radicals have the following general and preferred meanings.

R is a hydrocarbon radical with 1 to 6 carbon atoms or a phenyl radical. Preferably, R is a methyl radical. If the subscript a is equal to 2, two different R radicals, for example, a methyl and a phenyl radical, may be linked to the silicon atom.

$R^1$, $R^2$, $R^3$, $R^4$ may be the same or different and in each case represent a hydrogen or a methyl radical.

$R^5$, $R^6$, $R^7$ $R^8$ may be the same or different and in each case represent a hydrogen or fluorine radical, a hydrocarbon radical with 1 to 8 carbon atoms or a fluorinated hydrocarbon with 2 to 20 carbon atoms, at least one of the $R^5$, $R^6$, $R^7$, $R^8$ being a fluorine or a fluorinated hydrocarbon radical.

Within the hydrocarbon radicals with 1 to 8 carbon atoms, the alkyl radicals are preferred. Especially preferred are alkyl radicals with 1 to 4 carbon atoms, particularly the methyl radical. As fluorinated hydrocarbon radicals, especially the perfluorinated alkyl radicals are preferred. Examples of such radicals are the $-C_2F_5$, $-C_6F_{13}$, $-C_8F_{17}$, $-C_{14}F_{29}$ radicals.

Formula I is not restricted to a particular spatial structure with respect to the $R^1$ to $R^8$ substituents. It includes all stereoisomeric formulas.

Y is an organosiloxanyl radical which may consist of silicium units with different functionalities. The organosiloxanyl radical may be linear or branched.

Examples of such organosiloxanyl radicals are:

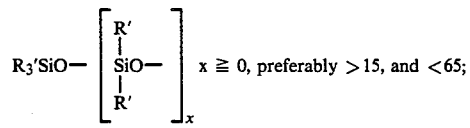

-continued
$$R_3'SiO-[R_2'SiO-]_x[R'SiO_{3/2}-]_z SiR_3' \quad z \geq 1$$

In this connection, R' is the same or different and in each case an alkyl radical with 1 to 3 carbon atoms, a hydrogen radical or a phenyl radical. Preferably, at least 50% of the R' radicals are methyl radicals.

R' can also represent a radical having the formula:

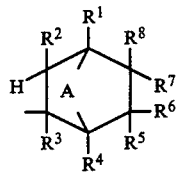
II

The molecular weight of the organosiloxanyl radical is 47 to 1,000,000 and, preferably, 7,000 to 60,000.

A is a divalent hydrocarbon radical or an oxygen radical. As a bivalent hydrocarbon radical, the $-CR_2^9$ radical is preferred in which $R^9$ may be the same or different and represents a hydrogen or methyl radical. The A radical can also be

radical.

a is a whole number and has a value of 0, 1 or 2.

For the purpose of the invention, compounds of formula I, which have the following combination of characteristics are preferred:
R is a methyl radical,
$R^1$, $R^2$, $R^3$, $R^4$ are hydrogen and/or methyl radicals,
$R^5$, $R^6$, $R^7$, $R^8$ are hydrogen or fluorine radicals or aliphatic hydrocarbon radicals with 1 to 6 carbon atoms, perfluorinated alkyl radicals with 6 to 14 carbon atoms, in which at least one $R^5$ to $R^8$ radical is a fluorine or perfluoroalkyl radical,
A is $-CH_2-$ or $-C(CH_3)_2$, and
a is 0, 1 or 2. Especially preferred are compounds with the following combination of characteristics:
R is a methyl radical;
$R^1$, $R^2$, $R^3$, $R^4$ are hydrogen radicals,
$R^5$, $R^6$, $R^7$, $R^8$ are hydrogen radicals or radicals of the formula $-C_nF_{2n+1}$, n being 6 to 8 and at least one perfluoroalkyl radical being present,
Y is a linear or branched organosiloxanyl radical, which optionally contains radicals of formula II, and
a is 0 or 1.

The compounds to be used according to the invention, are soluble in liquid fluorohydrocarbons and their mixtures with fluorinated hydrocarbons. The fluorine content preferably is at least 37 weight percent, and especially at least 45 weight percent. The molecular weight preferably lies in the range of 7,000 to 60,000.

In the following examples, the effectiveness of the compounds used inventively is confirmed quantitatively and compared with compounds of the state of the art.

The effectiveness of products suitable for defoaming degassing crude oil is checked as follows:

30 ml of degassed crude oil (so-called "dead crude oil") are added to a graduated glass autoclave, the temperature of which can be controlled and which is equipped with a manometer, an exhaust valve, a gas filling device, a safety valve, and a thermometer (measuring device in accordance with Utility Patent No. G 84 05 787). The crude oil is mixed (revived) with 40 ml of liquefied propane gas. After adjusting the temperature of the mixture which is stirred with a magnetic stirrer, the pressure is released at a constant gas flow rate of 15 l/min. The height of the foam as a function of the degassing time is measured. The area under the foam height/time curve is a measure of the foaming behavior of the crude oil and therefore also of the effectiveness of the defoamer. In the following examples, the area under the foam height/time curve is referred to as the foam index.

EXAMPLE 1

(Comparison Example not in Accordance with the Invention)

Two products of the state of the art are used as comparison substances and checked at two levels of addition using two "dead crude oils" from North Sea oil fields which are particularly difficult to defoam. The results are summarized in Table 1.

TABLE 1

|  |  | Foam Index | |
|---|---|---|---|
|  |  | dead crude oil 1 | dead crude oil 2 |
| without any defoamer |  | 55 | 42 |
| average molecular weight |  |  |  |
| polydimethylsiloxane | 1 ppm | 50 | 40 |
| viscosity: 60,000 mPas | 5 ppm | 45 | 35 |
| high molecular weight |  |  |  |
| polydimethylsiloxane of | 1 ppm | 49 | 40 |
| European Patent Appl. |  |  |  |
| 0 091 257 |  |  |  |
| viscosity: 625,000 mPas | 5 ppm | 35 | 33 |
| trifluoropropyl-poly- | 1 ppm | 39 | 29 |
| methylsiloxane |  |  |  |
| viscosity: 1,000 mPas | 5 ppm | 27 | 34 |
| trifluoropropyl-poly | 1 ppm | 35 | 24 |
| methylsiloxane |  |  |  |
| viscosity: 10,000 mPas | 5 ppm | 35 | 23 |

EXAMPLE 2

(In Accordance with the Invention)

The defoamers to be used inventively were tested in the described manner using the "dead crude oils" mentioned in Example 1. The composition of the defoamers as well as the results are summarized in Table 2.

TABLE 2

|  |  | Foam Index | |
|---|---|---|---|
|  |  | dead crude oil 1 | dead crude oil 2 |
| without any defoamer |  | 55 | 42 |
|  | 0.5 ppm | 23 | 21 |
| Defoamer A | 1 ppm | 17 | 15 |
|  | 5 ppm | 4 | 6 |
| Defoamer B | 0.5 ppm | 29 | 15 |
|  | 1 ppm | 11 | 12 |
|  | 5 ppm | 8 | 5 |
| Defoamer C | 0.5 ppm | 27 | 24 |
|  | 1 ppm | 23 | 17 |
|  | 5 ppm | 18 | 14 |
| Defoamer D | 0.5 ppm | 20 | 21 |
|  | 1 ppm | 14 | 12 |

TABLE 2-continued

| | Foam Index | |
|---|---|---|
| | dead crude oil 1 | dead crude oil 2 |
| 5 ppm | 5 | 5 |

Defoamer A:

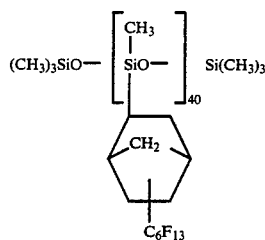

Defoamer B:

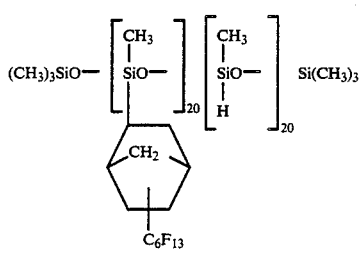

Defoamer C:

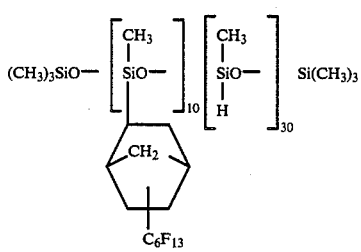

Defoamer D:

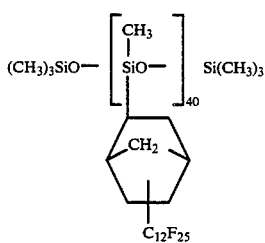

A comparison experiment with norbornene-free siloxanes, similar to defoamers A, B and C, and with siloxane-free perfluorohexylnorbornenes shows that the components have no (norbornenes) or a significantly inferior (siloxanes) defoaming efficiency.

We claim:

1. In a method for defoaming crude oil containing volatile hydrocarbons under pressure wherein a defoaming effective amount of a defoaming agent is added to the crude oil, the improvement which comprises using as the defoaming agent, a fluorinated norbornylsiloxane having the general formula

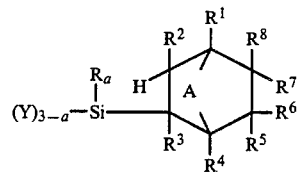

in which

R is a hydrocarbon radical with 1 to 6 carbon atoms or a phenyl radical;

$R^1$, $R^2$, $R^3$, $R^4$ are the same or different and represent hydrogen or methyl radicals;

$R^5$, $R^6$, $R^7$, $R^8$ are the same or different and represent hydrogen, fluorine radicals, hydrocarbon radicals with 1 to 8 carbon atoms, or fluorinated hydrocarbon radicals with 1 to 20 carbon atoms, in which at least one of the $R^5$, $R^6$, $R^7$, $R^8$ radicals must be a fluorine or a fluorinated hydrocarbon radical;

Y is an organosiloxanyl radical,

A is a divalent hydrocarbon radical or an oxygen radical, and a is 0, 1 or 2.

2. The method of claim 1 wherein the amount of foaming agent used is from 0.2 to 20 ppm.

3. The method of claim 1 or 2 wherein R is methyl.

4. The method of claim 1 or 2 wherein a is 2 and R is two different radicals.

5. The method of claim 4 wherein R is methyl and phenyl.

6. The methods of claim 1 or 2 wherein $R^5$, $R^6$, $R^7$ and $R^8$ are perfluorinated alkyl radicals selected from the group consisting of $—C_2F_5$, $—C_6F_{13}$, $—C_8F_{17}$ and $—C_{14}F_{29}$.

7. The method of claim 1 or 2 wherein the organosiloxanyl radical is selected from the group consisting of

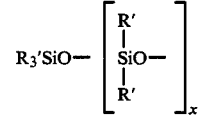

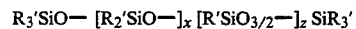

wherein R' is the same or different and is alkyl having 1 to 3 carbon atoms, hydrogen, or phenyl, x is equal to 0 or has a positive value, and z is equal to or greater than 1.

8. The method of claim 7 wherein x is between 15 and 65.

9. The method of claim 7 wherein at least 50% of the R' radicals are methyl radicals.

10. The method of claim 1 or 2 wherein the organosiloxanyl radical is selected from the group consisting of

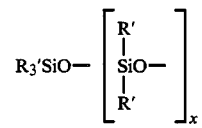

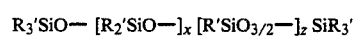

wherein R' is

[structure: cyclohexane-like ring labeled A with substituents R¹, R², R³, R⁴, R⁵, R⁶, R⁷, R⁸ and H]

11. The method of claim 1 or 2 wherein the molecular weight of the organosiloxanyl radical is from 47 to 1,000,000.

12. The method of claim 11 wherein the molecular weight is from 7,000 to 60,000.

13. The method of claim 1 or 2 wherein A is selected from the group consisting of the —CR$_2^9$ radical wherein R$^9$ may be the same or different and is hydrogen or methyl and the $$-\overset{H}{\underset{CH_3}{C}}-$$

radical.

14. In a method for defoaming crude oil containing volatile hydrocarbons under pressure wherein a defoaming effective amount of a defoaming agent is added to the crude oil, the improvement which comprises using as the defoaming agent, a fluorinated nnorbornylsiloxane having the general formula

[structure: $(Y)_{3-a}$—Si—R$_a$ attached to ring A with substituents R¹–R⁸ and H]

in which
R is a methyl radical,
R$^1$, R$^2$, R$^3$, R$^4$ are hydrogen or methyl radicals,
R$^5$, R$^6$, R$^7$, R$^8$ are selected from the group consisting of hydrogen, fluorine radicals or aliphatic hydrocarbon radicals with 1 to 6 carbon atoms, perfluorinated alkyl radicals with 6 to 14 carbon atoms, in which at least one R$^5$ to R$^8$ radical is a fluorine or the perfluoroalkyl radical,
A is —CH$_2$— or —C(CH$_3$)$_2$, and
a is 0, 1 or 2.

15. In a method for defoaming crude oil containing volatile hydrocarbons under pressure wherein a defoaming effective amount of a defoaming agent is added to the crude oil, the improvement which comprises using as the defoaming agent, a fluorinated norbornylsiloxane having the general formula

[structure: $(Y)_{3-a}$—Si—R$_a$ attached to ring A with substituents R¹–R⁸ and H]

in which
R is a methyl radical;
R$^1$, R$^2$, R$^3$, R$^4$ are hydrogen radicals,
R$^5$, R$^6$, R$^7$, R$^8$ are hydrogen radicals or radicals of the formula —C$_n$F$_{2n+1}$, n being 6 to 8 and at least one perfluoroalkyl radical being present,
Y is a linear or branched organosiloxanyl radical, and
a is 0 or 1.

16. The method of claim 15 wherein the organosiloxanyl radical is selected from the group consisting of $$R_3'SiO-\left[\begin{array}{c} R' \\ | \\ SiO- \\ | \\ R' \end{array}\right]_x$$

$R_3'SiO— [R_2'SiO—]_x [R'SiO_{3/2}—]_z SiR_3'$ wherein R' is the same or different and is alkyl having 1 to 3 carbon atoms, hydrogen, or phenyl, x is equal to 0 or has a positive value, and z is equal to or greater than 1.

17. The method of claim 15 wherein the organosiloxanyl radical is selected from the group consisting of $$R_3'SiO-\left[\begin{array}{c} R' \\ | \\ SiO- \\ | \\ R' \end{array}\right]_x$$

$R_3'SiO— [R_2'SiO—]_x [R'SiO_{3/2}—]_z SiR_3'$ wherein R' is

[structure: ring A with substituents R¹–R⁷ and H]

18. The method of claim 1 or 2 wherein as many as three of the groups R$^5$, R$^6$, R$^7$ and R$^8$ are alkyl having 1 to 4 carbon atoms.

19. The method of claim 18 wherein as many as three of the groups R$^5$, R$^6$, R$^7$ and R$^8$ are methyl.

* * * * *